(12) United States Patent
Kim

(10) Patent No.: US 8,606,192 B2
(45) Date of Patent: Dec. 10, 2013

(54) APPARATUS AND METHOD FOR POWER CONTROL IN MOBILE COMMUNICATION SYSTEM

(75) Inventor: Chul-Kyung Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1093 days.

(21) Appl. No.: 12/539,962

(22) Filed: Aug. 12, 2009

(65) Prior Publication Data
US 2010/0041340 A1    Feb. 18, 2010

(30) Foreign Application Priority Data
Aug. 12, 2008  (KR) ........................ 10-2008-0078959

(51) Int. Cl.
*H04B 17/00* (2006.01)
(52) U.S. Cl.
USPC ........................................ 455/67.13
(58) Field of Classification Search
USPC .............. 455/67.13, 522, 15, 69, 67.11, 63.1, 455/127.5; 370/342, 335, 318, 320; 713/320
See application file for complete search history.

(56) References Cited

U.S. PATENT DOCUMENTS

| | | | |
|---|---|---|---|
| 6,529,482 B1* | 3/2003 | Lundby | 370/252 |
| 2004/0106425 A1* | 6/2004 | Koo et al. | 455/522 |
| 2004/0121794 A1* | 6/2004 | Koo et al. | 455/522 |
| 2007/0173281 A1* | 7/2007 | Koo et al. | 455/522 |
| 2007/0218937 A1* | 9/2007 | Koo et al. | 455/522 |
| 2010/0081469 A1* | 4/2010 | Kazmi et al. | 455/522 |

* cited by examiner

*Primary Examiner* — Shaima Q Aminzay
(74) *Attorney, Agent, or Firm* — The Farrell Law Firm, P.C.

(57) ABSTRACT

An apparatus and method for flexibly changing a fixed target SIR, a fixed target SIR step size, and a time to perform a TX power control request, in order to prevent a receiver apparatus from performing an excessive TX power control request upon a sudden RX channel environment change in a mobile communication system. The apparatus includes a target Signal-to-Interference Ratio (SIR) determiner for flexibly changing a fixed target SIR upon a sudden target SIR re-decrease, after a previous increase, by decreasing a target SIR by a large step size at an initial stage of a sudden target SIR increase and decreasing the target SIR down-step size with an approach to a normal target SIR.

8 Claims, 7 Drawing Sheets

APPARATUS AND METHOD FOR POWER CONTROL IN MOBILE COMMUNICATION SYSTEM

PRIORITY

This application claims priority under 35 U.S.C. §119(a) to an application filed in the Korean Intellectual Property Office on Aug. 12, 2008, and assigned Serial No. 10-2008-0078959, the content of which is incorporated herein by reference.

BACKGROUND OF THE INVENTION

1. Field of the Invention

The present invention relates generally to an apparatus and method for power control in a mobile communication system, and more particularly, to an apparatus and method for flexibly changing a fixed target Signal-to-Interference Ratio (SIR), a fixed target SIR step, and a time to perform a transmission (TX) power control request, in order to prevent a receiver apparatus from performing an excessive TX power control request in the event of a sudden reception (RX) channel environment change.

2. Description of the Related Art

In a mobile communication system, when an output power of a Mobile Station (MS) is high, this often causes interference with an adjacent MS. The adjacent MS detects a noise of the interference, and increases its output power in order to increase an SIR (or a Signal-to-Noise Ratio (SNR)). Consequently, the mobile communication system maintains the same output power level of adjacent MSs to control the data TX power of a transmitter.

Directly controlling the TX power of a mobile communication system as described above is referred to as an inner loop power control, and setting the range of the inner loop power control is referred to as an outer loop power control.

The above-described TX power control method is applicable to a Base Station (BS) controlling the output power of an MS, and to an MS controlling the output power of a BS.

In Wideband Code Division Multiple Access (CDMA), for TX power control, a receiver apparatus uses a BLock Error Rate (BLER) satisfying a Quality of Service (QoS). This ensures that data of an RX transport block is received at a certain level. The receiver apparatus measures the BLER of the current channel, determines whether to control the TX power of a transmitter, and requests the transmitter apparatus to increase/decrease its TX power accordingly.

The receiver apparatus uses the SIR of an RX channel to detect a channel BLER. More specifically, the receiver apparatus measures the SIR of an RX channel and sets a target SIR satisfying a desired BLER of the receiver apparatus.

Thereafter, if the SIR of the current RX channel is smaller than the target SIR, the receiver apparatus transmits a Transmission Power Control (TPC) Up request to the transmitter apparatus. However, if the SIR of the current RX channel is greater than the target SIR, the receiver apparatus transmits a TPC Down request to the transmitter apparatus, thereby adjusting the BLER of a RX Dedicated Channel (DCH).

The receiver apparatus may detect the occurrence or nonoccurrence of a transport block error at every Transmission Time Interval (TTI) to set the target SIR.

For example, after detecting the occurrence of a transport block error, the receiver apparatus adds an SIR Step Up size to the current target SIR to set the next target SIR (Next_Target_SIR=Current_Target_SIR+SIR_Step_Up). After detecting the nonoccurrence of a transport block error, the receiver apparatus subtracts an SIR Step Down size from the current target SIR to set the next target SIR (Next_Target_SIR=Current_Target_SIR−SIR_Step_Down). Herein, the SIR Step Down size is the product of the SIR Step Up size and the BLER (SIR_Step_Down=SIR_Step_Up× BLER).

As described above, the target SIR is not fixed, but varies depending on the channel environment. However, in the event of a sudden channel environment change, a sudden Additive White Gaussian Noise (AWGN) decrease, a sudden channel fading change, or a BS output power decrease or increase, a receiver apparatus will request an excessive output power of a transmitter apparatus in order to satisfy the BLER.

SUMMARY OF THE INVENTION

Therefore, the present invention has been designed to address at least the above-mentioned problems and/or disadvantages and to provide at least the advantages below. Accordingly, an aspect of the present invention is to provide an apparatus and method for preventing a receiver apparatus from performing an excessive TX power control request in the event of a sudden RX channel environment change in a mobile communication system.

Another aspect of the present invention is to provide an apparatus and method for flexibly changing a fixed target SIR in order to prevent a receiver apparatus from performing an excessive TX power control request.

Another aspect of the present invention is to provide an apparatus and method for flexibly changing a fixed target SIR step size in order to prevent a receiver apparatus from performing an excessive TX power control request.

Another aspect of the present invention is to provide an apparatus and method for flexibly changing a time to perform a TX power control request, in order to prevent a receiver apparatus from performing an excessive TX power control request.

In accordance with an aspect of the present invention, an apparatus for power control in a mobile communication system is provided. The apparatus includes: an SIR determiner for flexibly changing a fixed target SIR in an event of a sudden target SIR re-decrease, after increase, by decreasing the target SIR by a large step size at an initial stage of a sudden target SIR increase, and decreasing the target SIR down-step size with an approach to a normal target SIR.

In accordance with another aspect of the present invention, a method for power control in a mobile communication system is provided. The method includes: determining a down-step size in an event of a sudden target SIR re-decrease, after an increase, by decreasing the target SIR by a large step size at an initial stage of a sudden target SIR increase and decreasing the target SIR down-step size with an approach to a normal target SIR.

BRIEF DESCRIPTION OF THE DRAWINGS

The above and other aspects, features, and advantages of certain embodiments of the present invention will become more apparent from the following detailed description when taken in conjunction with the accompanying drawings in which.

DETAILED DESCRIPTION OF EMBODIMENTS OF THE INVENTION

Embodiments of the present invention will be described herein below with reference to the accompanying drawings. In the following description, detailed descriptions of well-known functions or constructions will be omitted because they may obscure the present invention in unnecessary detail.

The present invention provides an apparatus and method for flexibly changing a fixed target Signal-to-Interference Ratio (SIR), a fixed target SIR step size, and a time to perform a TX power control request, in order to prevent a receiver apparatus from performing an excessive TX power control request in an event of a sudden RX channel environment change in a mobile communication system.

Figure 1:
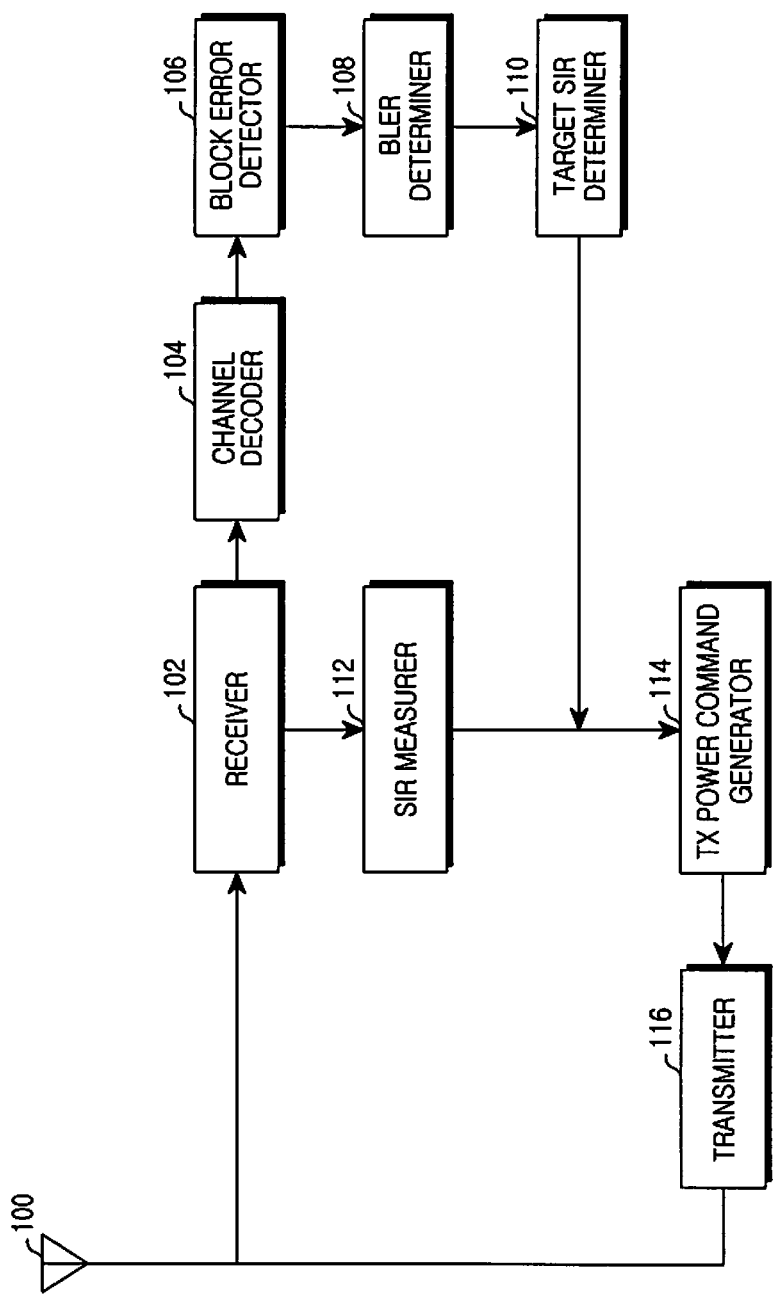
FIG. 1 is a block diagram of a receiver apparatus for preventing an excessive TX power control request in the event of a sudden RX channel environment change according to an embodiment of the present invention.

FIG. 1 is a block diagram of a receiver apparatus for preventing an excessive TX power control request in the event of a sudden RX channel environment change according to an embodiment of the present invention.

Referring to FIG. 1, the receiver apparatus includes a receiver 102, a channel decoder 104, a block error detector 106, a BLock Error Rate (BLER) determiner 108, a target SIR determiner 110, an SIR measurer 112, a TX power command generator 114, and a transmitter 116.

The receiver 102 converts a Radio Frequency (RF) signal, received through an antenna 100, into a baseband analog signal and coverts the analog signal into a digital signal, which is then decoded by the channel decoder 104.

The block error detector 106 detects a Cyclic Redundancy Check (CRC) error according to the decoding operation of the channel decoder 104, and provides the CRC error detection result to the BLER determiner 108.

The BLER determiner 108 determines a BLER of an RX transport block, based on the CRC error detection result received from the block error detector 106. Also, the BLER determiner 108 compares a threshold value and a difference between the determined BLER and a target BLER received from a BS, and provides the comparison result to the target SIR determiner 110.

When a sudden RX channel environment change is detected according to the error detection for the transport block, the target SIR determiner 110 flexibly changes a fixed target SIR, a fixed target SIR step size, and a time to perform a TX power control request, in order to prevent the receiver apparatus from performing an excessive TX power control request.

For example, upon detection of a normal CRC error in the receiver apparatus, the target SIR determiner 110 performs a conventional target SIR setting operation according to the error occurrence. However, in the event of a sudden target SIR re-decrease, such as upon a nonoccurrence of the CRC error, the target SIR determiner 110 then decreases the target SIR by a step size which is larger than a target SIR down-step size at an initial stage of a sudden target SIR increase and decreases the target SIR down-step size with an approach to the target SIR such as a nonoccurrence of the CRC error. The target SIR down-step size is a constant one step size by which increased target SIR due to occurrence of CRC error is decreased. In other words, the target SIR down-step size has a regular size regularly divided between the top and the bottom values of the target SIR.

Figure 3:
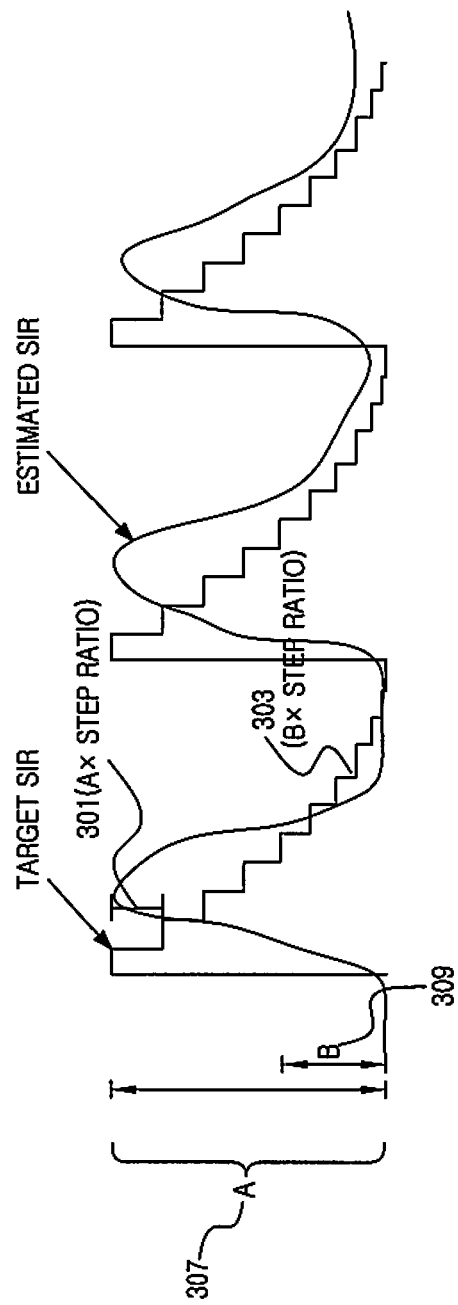
FIG. 3 is a diagram illustrating a process for setting a target SIR down-step size in a receiver apparatus according to an embodiment of the present invention.

In FIG. 3, a step size shown as 301 is a step size of the target SIR decreased larger than a target SIR down-step size at an initial stage of a sudden target SIR increase.

Also, the target SIR determiner 110 compares the current BLER and the target BLER. If the current BLER is greater than the target BLER, the target SIR determiner 110 subtracts a weight a from the current target SIR to set the next target SIR (Next_Target_SIR=Current_Target_SIR−α), in order to decrease the target SIR by a step size which is larger than the target SIR down-step size at an initial stage of a sudden target SIR increase and decrease the target SIR down-step size with the approach to the target SIR such as a nonoccurrence of the CRC error.

Further, in order to prevent a TX power control caused by consecutive errors, the target SIR determiner 110 stops increasing the target SIR, if a number of errors to occur is greater than or equal to a maximum error number, and increases the target SIR, if the number of errors to occur is smaller than the maximum error number. In order to prevent an excessive target SIR increase according to a sudden error increase, the target SIR determiner 110 stops increasing the target SIR, if errors occur more frequently than the maximum error rate.

The SIR measurer 112 measures an SIR of the RX signal and provides the measured SIR to the TX power command generator 114. The TX power command generator 114 generates a TX power control command based on the measured SIR and the target SIR received from the target SIR determiner 110.

Thereafter, the transmitter 116 of the receiver apparatus transmits the TX power control command generated by the TX power command generator 114.

Figure 2:
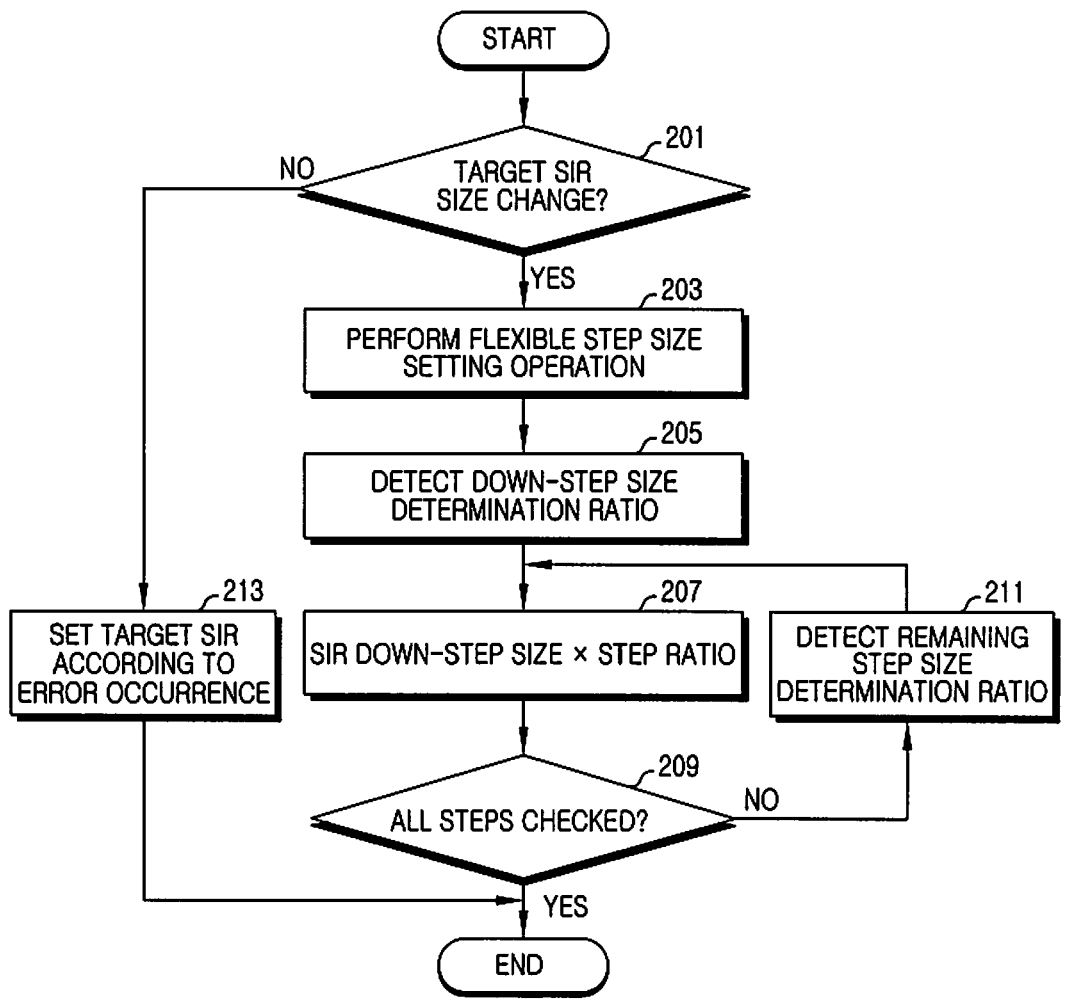
FIG. 2 is a flow chart illustrating a process for changing a target SIR down-step size in a receiver apparatus according to an embodiment of the present invention.

FIG. 2 is a flow chart illustrating a process for changing a target SIR down-step size in a receiver apparatus according to an embodiment of the present invention.

Referring to FIG. 2, in step 201, the receiver apparatus determines whether a target SIR size changes. Herein, the target SIR size change is a sudden target SIR re-decrease, such as a nonoccurrence of the CRC error, after the occurrence of the CRC error in the receiver apparatus.

If the target SIR size does not change in step 201, i.e., upon an occurrence of a CRC error, the receiver apparatus sets the target SIR according to the error occurrence in step 213.

However, if the target SIR size changes in step 201, i.e., upon a nonoccurrence of a CRC error, after an occurrence of a CRC error, the receiver apparatus decreases the target SIR in step 203. Herein, the receiver apparatus performs a flexible step size setting operation to decreases the target SIR by a large step size at an initial stage of a sudden target SIR increase and to decrease the target SIR down-step size with an approach to the target SIR such as a nonoccurrence of the CRC error. The large step size is larger than the target SIR down-step size.

In step 205, the receiver apparatus detects a down-step size determination ratio in order to perform the step size setting operation. The down-step size determination ratio is used to determine the step size of the target SIR, and increases at an initial stage of a sudden target SIR increase.

In step 207, the receiver apparatus determines a down-step size by applying the down-step size determination ratio to a reference target SIR, and decreases the target SIR size. The reference target SIR may be determined by dividing the target SIR down-step size by the total repetition frequency minus the repetition performance frequency.

In step 209, the receiver apparatus determines whether a repetition operation according to the error occurrence is to be performed, i.e., the receiver determines if all steps are checked based on the BLER.

If the repetition operation according to the error occurrence is to be performed in step 209, i.e., if there are still steps to be checked, the receiver apparatus detects the down-step size determination ratio according to the remaining repetition frequency in step 211. More specifically, the receiver apparatus detects the step size determination ratio corresponding to the target SIR of the difference between the target SIR down-step size and the down-step size determined in step 207.

Thereafter, n step 207, the receiver apparatus determines a down-step size by using the step size determination ratio determined in step 211, and decreases the target SIR size.

If the repetition operation according to the error occurrence is not to be performed in step 209, i.e., if all steps are checked, the receiver apparatus ends the process.

As described above, in order to determine the down-step size, the receiver apparatus repeats an operation of determining a flexible down-step size by multiplying a general down-step size and the down-step size determination ratio, by the down-step size determination frequency, based on the BLER according to the CRC error occurrence.

FIG. 3 is a diagram illustrating a process for setting a target SIR down-step size in a receiver apparatus according to an embodiment of the present invention.

Referring to FIG. 3, in the event of a sudden target SIR re-decrease, such as upon a nonoccurrence of a CRC error, after an occurrence of a CRC error in the receiver apparatus, the receiver apparatus performs a flexible step size setting operation to decrease a target SIR by a large step size at an initial stage of a sudden target SIR increase (301) and to decrease the target SIR down-step size with an approach to the target SIR (309) such as a nonoccurrence of the CRC error, instead of performing a conventional step size setting operation that decreases the target SIR down-step size simply by a fixed step size.

Herein, the receiver apparatus may perform a flexible step size setting operation as will be described below.

When the target SIR increases due to a CRC error occurrence, the receiver apparatus sets the down-step size setting operation repetition frequency based on the CRC error occurrence frequency.

Accordingly, the receiver apparatus determines a reference target SIR by dividing a target SIR down-step size by a total repetition frequency minus a repetition performance frequency (Reference Target Sir (REF)=Target SIR (RESIDUAL)/(Total Repetition Frequency (COUNTALL)−Repetition Performance Frequency)).

Thereafter, if a CRC error does not occur, the receiver apparatus determines a flexible target SIR down-step size. The target SIR down-sep size is determined by multiplying the reference target SIR and the down-step size determination ratio (Current Target SIR Change (CHANGE)=Reference Target SIR Change (REF)×Down-Step Size Determination Ratio).

Thereafter, the receiver apparatus resets the down-step size based on the down-step size setting operation repetition frequency. Herein, the receiver apparatus may set the target SIR (RESIDUAL) by subtracting the current target SIR change from the previous target SIR (RESIDUAL).

Figure 4:
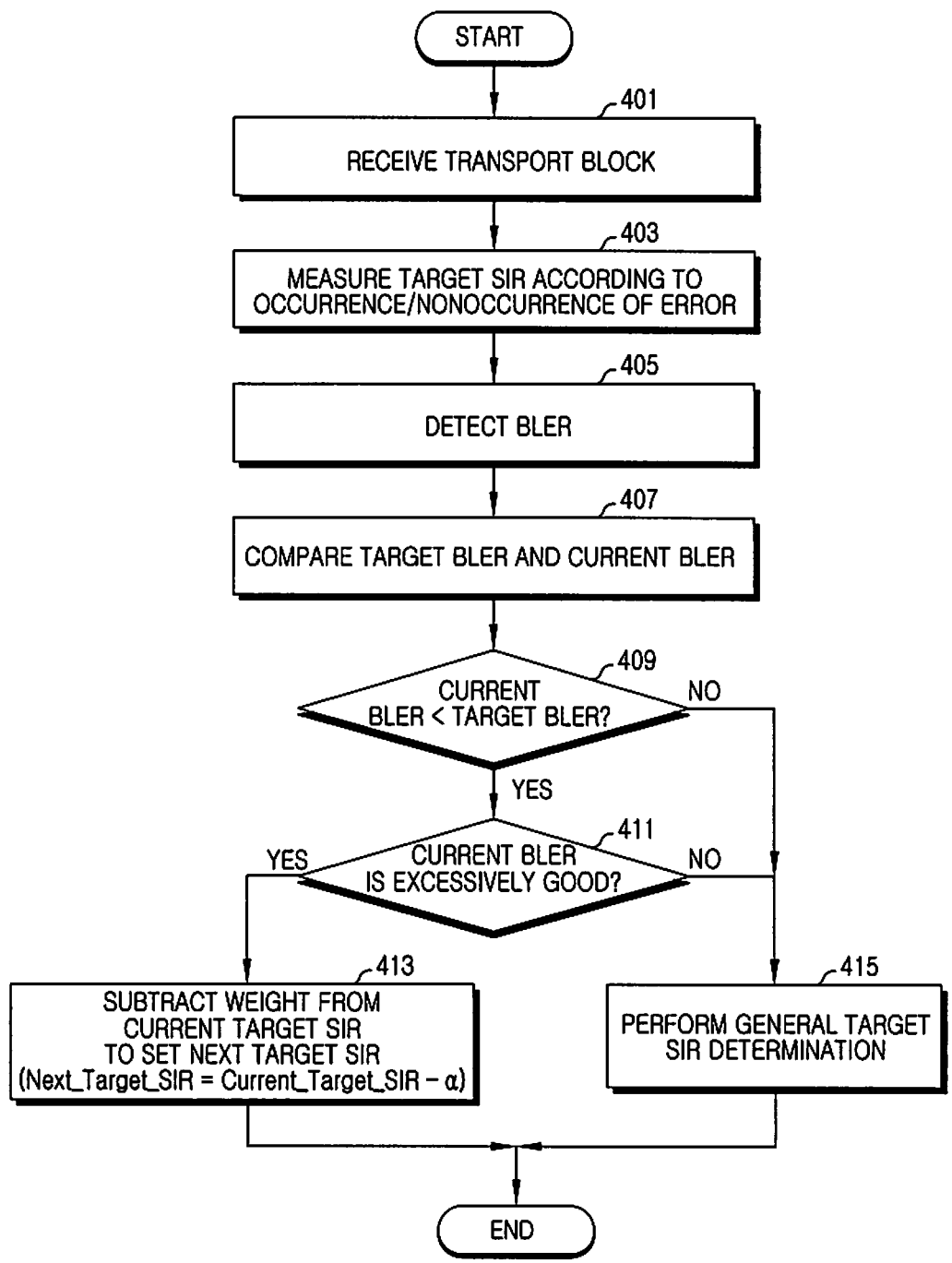
FIG. 4 is a flow chart illustrating a process for setting a target SIR based on a block error rate in a receiver apparatus according to an embodiment of the present invention.

FIG. 4 is a flow chart illustrating a process for setting a target SIR, based on a block error rate in a receiver apparatus according to an embodiment of the present invention.

Referring to FIG. 4, the receiver apparatus receives a transport block in step 401. In step 403, the receiver apparatus performs a target SIR setting operation according to the occurrence or nonoccurrence of an error. Herein, the target SIR setting operation is an operation of determining the occurrence or nonoccurrence of an error in the transport block, increasing a step of a target SIR in an occurrence of a transport block error, and decreasing the step of the target SIR in a nonoccurrence of a transport block error.

In step 405, the receiver apparatus detects a current BLER and a target BLER received from a transmitter apparatus.

In step 407, the receiver apparatus compares the target BLER and the current BLER detected in step 405.

In step 409, the receiver apparatus determines whether the current BLER is smaller than the target BLER. If the current BLER is greater than the target BLER, the receiver apparatus performs a conventional target SIR setting operation.

However, if the current BLER is smaller than the target BLER in step 409, in step 411, the receiver apparatus determines whether the current BLER is excessively good. The current BLER is excessively good means that current BLER is smaller than the target BLER by a predetermined factor.

If the current BLER is not excessively good in step 411, the receiver apparatus performs the conventional target SIR setting operation.

However, if the current BLER is excessively good in step 411, the receiver apparatus subtracts a weight a from the current target SIR to set the next target SIR (Next_Target_SIR=Current_Target_SIR−α) in step 413. The weight α serves to rapidly decrease the target SIR. That is, the weight α is used to further subtract a predetermined value from a general target SIR in order to prevent excessive power allocation from a BS.

Thereafter, the receiver apparatus ends the process.

Figure 5A:
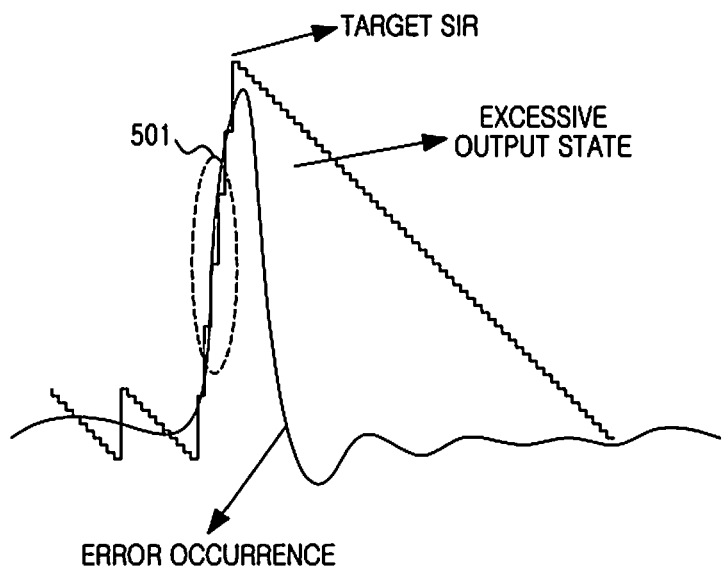
FIG. 5A is a diagram illustrating a conventional target SIR setting process in a receiver apparatus.

FIG. 5A is a diagram illustrating a conventional target SIR setting process in the receiver apparatus.

Referring to FIG. 5A, upon detection of an error in an RX transport block, the receiver apparatus performs a conventional target SIR setting operation. That is, upon detection of an error in the transport block (501), the receiver apparatus adds an SIR Step Up size to the current target SIR to set the next target SIR (Next_Target_SIR=Current_Target_SIR+SIR_Step_Up).

Figure 5B:
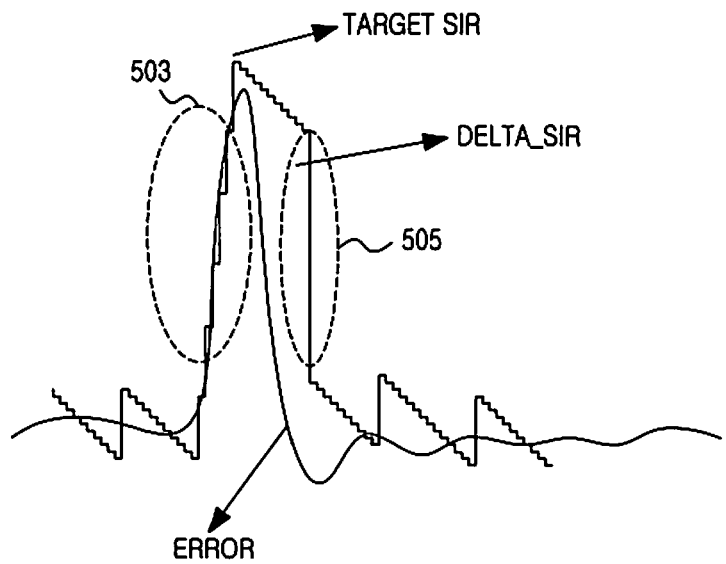
FIG. 5B is a diagram illustrating a process for setting a target SIR in a receiver apparatus according to an embodiment of the present invention.

FIG. 5B is a diagram illustrating a process for setting a target SIR in a receiver apparatus according to an embodiment of the present invention.

Referring to FIG. 5B, the receiver apparatus detects an error in an RX transport block (503), and compares the target BLER and the current BLER. If the current BLER is smaller than the target BLER by a predetermined factor (e.g., about 0.5 or 0.3 time of the target BLER), the receiver apparatus adds a weight to the current target SIR to set the next target SIR (505). That is, if the target BLER is greater than the current BLER by a predetermined factor, the receiver apparatus further subtracts a predetermined value from the current target SIR (Current_Target_SIR−α) to set the next target SIR, such that the target SIR decreases by a large step size, which is greater than the normal SIR variation, to rapidly reach the normal state.

Figure 6:
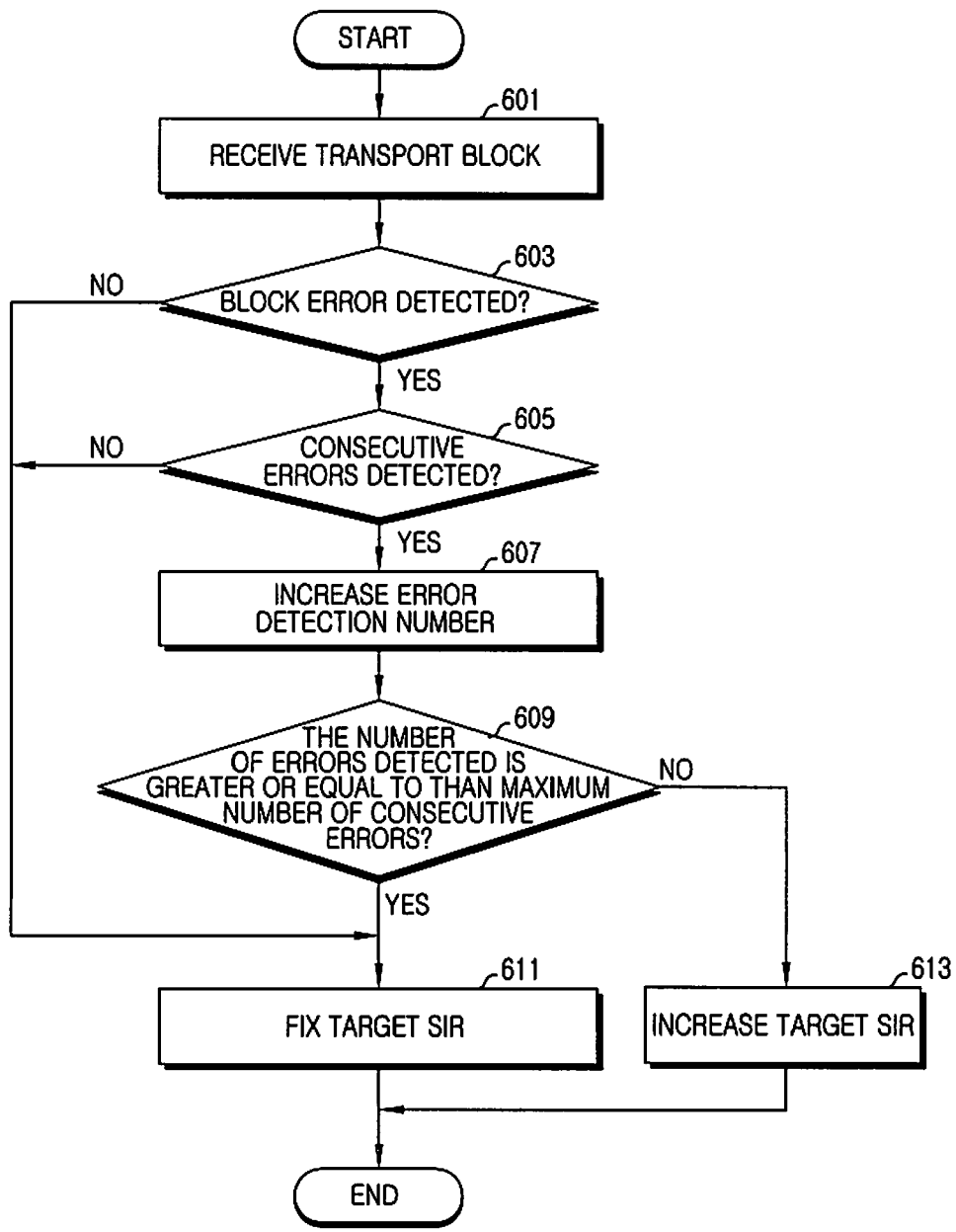
FIG. 6 is a flow chart illustrating a process for preventing an occurrence of a TX power control caused by an occurrence of consecutive errors in a receiver apparatus according to an embodiment of the present invention.

FIG. 6 is a flow chart illustrating a process for preventing an occurrence of a TX power control caused by an occurrence of consecutive errors in a receiver apparatus according to an embodiment of the present invention.

Referring to FIG. 6, the receiver apparatus receives a transport block in step 601. In step 603, the receiver apparatus determines whether a transport block error occurs.

If a transport block error occurs in step 603, the receiver apparatus determines whether consecutive errors occur in step 605. If consecutive errors occur, the receiver apparatus stops increasing the target SIR in order not to increase the target SIR even in the event of a continuous error increase. This is to prevent an excessive target SIR increase caused by a sudden error increase.

If consecutive errors do not occur in step 605, in step 611, the receiver apparatus fixes the target SIR by stopping a target SIR increasing operation.

In step 607, although the receiver apparatus stops increasing the target SIR, the receiver apparatus increases the error detection number. In step 609, the receiver apparatus compares a number of errors detected and a maximum number of consecutive errors. Herein, the maximum number of consecutive errors is the consecutive error number for determining the occurrence or nonoccurrence of an excessive target SIR increase. The maximum number of consecutive errors may be determined based on designer preference and/or system requirements.

If the number of errors detected is greater than or equal to the maximum number of consecutive errors in step 609, the receiver apparatus fixes the target SIR to prevent an excessive TX power control caused by the occurrence of consecutive errors in step 611.

However, if the number of errors detected is smaller than the maximum number of consecutive errors in step 609, the receiver apparatus increases the target SIR in step 613.

Thereafter, the receiver apparatus ends the process.

Figure 7:
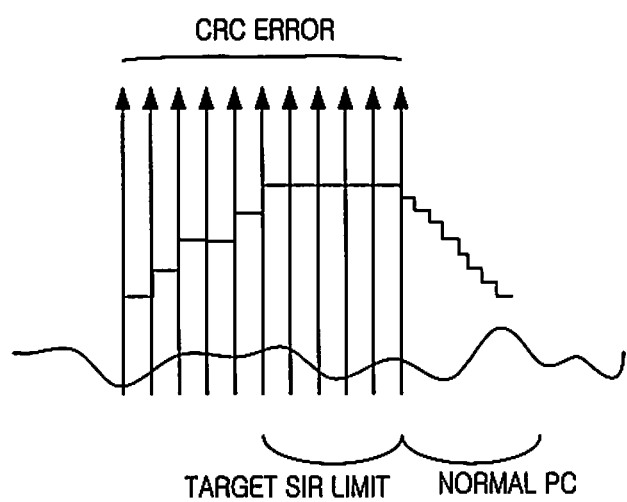
FIG. 7 is a diagram illustrating a process for using an error rate of a transport block to prevent an occurrence of a TX power control caused by an occurrence of consecutive errors in a receiver apparatus according to an embodiment of the present invention.

FIG. 7 is a diagram illustrating a process for using an error rate of a transport block to prevent an occurrence of a TX power control caused by an occurrence of consecutive errors in a receiver apparatus according to an embodiment of the present invention.

Referring to FIG. 7, if detecting an error in a transport block, the receiver apparatus adds an SIR Step Up size to the current target SIR to set the next target SIR. If errors occur frequently, an excessive downlink DPCH power request occurs.

If errors more than a predetermined maximum error number occur, in accordance with an embodiment of the present invention, a receiver apparatus stops a target SIR increasing operation to prevent the occurrence of excessive TX power.

Specifically, upon an occurrence of transport block errors, if a number of consecutive errors is greater than a maximum consecutive error number, the receiver apparatus identifies this as an occurrence of an excessive TX power control and performs a TX power control request. In order to prevent an excessive TX power control request caused by the occurrence of frequent errors, the receiver apparatus determines the maximum error rate for error occurrence determination and fixes the target SIR increase for a transport block in the event of the occurrence of errors more than the maximum error rate.

However, upon the occurrence of fewer errors than the maximum error rate, the receiver apparatus performs a normal power control request operation.

As described above, the embodiments of the present invention flexibly changes a fixed target SIR, a fixed target SIR step size, and time to perform a TX power control request, in order to prevent a receiver apparatus from performing an excessive TX power control request in the event of a sudden RX channel environment change in a mobile communication system. Thus, in the event of a sudden channel environment change, the embodiments of the present invention can prevent an excessive downlink channel output power of the receiver apparatus to eliminate the noise interference between the receiver apparatuses. Accordingly, the embodiments of the present invention improve the performance of a mobile communication system.

While the present invention has been shown and described with reference to certain preferred embodiments thereof, it will be understood by those skilled in the art that various changes in form and details may be made therein without departing from the spirit and scope of the invention as defined by the appended claims. Therefore, the scope of the present invention is defined not by the detailed description of the invention but by the appended claims, and all differences within the scope will be construed as being included in the present invention.

What is claimed is:

1. An apparatus for power control in a mobile communication system, the apparatus comprising: a target Signal-to-Interference Ratio (SIR) determiner for flexibly changing a fixed target SIR upon a sudden target SIR decrease following, a previous increase, wherein the target SIR determiner decreases the target SIR by a plurality of steps, wherein a step size of a first step of the plurality of steps is larger than a down-step size of the target SIR, and wherein a step size of each of subsequent steps of the plurality of steps is smaller than the first step of the plurality of steps, and wherein the target SIR determiner detects a down-step size determination ratio of a step size determination ratio corresponding to a down step of a remaining target SIR from an increased target SIR to the normal target SIR, and sets a flexible down step size by multiplying the target SIR down-step size and the detected down-step size determination ratio.

2. The apparatus of claim 1, wherein the target SIR determiner compares a current block error rate and a target block error rate, and flexibly changes a target SIR step size by subtracting a predetermined weight from a current target SIR to set a next target SIR, if the current block error rate is greater than the target block error rate.

3. The apparatus of claim 1, wherein the target SIR determiner flexibly changes a time to perform a transmission power control request, by increasing an error detection number upon an occurrence of consecutive errors in a received transport block and stopping a target SIR increasing operation, if an error detection number is greater than or equal to a maximum consecutive error number.

4. The apparatus of claim 3, wherein the target SIR determiner stops the target SIR increasing operation, if the received transport block error rate is greater than or equal to a maximum error rate.

5. A method for power control in a mobile communication system, the method comprising: determining, by a target Signal-to-Interference Ratio (SIR) determiner, down-step sizes upon a sudden target SIR decrease following, a target SIR increase, by decreasing a target SIR by a plurality of steps, wherein a step size of a first step of the plurality of steps is larger than a down-step size of the target SIR, and wherein a step size of each of subsequent steps of the plurality of steps is smaller than the first step of the plurality of steps, and detecting a down-step size determination ratio of a step size determination ratio corresponding to a down step of a remaining target SIR from an increased target SIR to the normal target SIR; and setting a flexible down step size by multiplying the target SIR down-step size and the detected down-step size determination ratio.

6. The method of claim 5, further comprising:

comparing a current block error rate and a target block error rate; and flexibly changing a target SIR step size by subtracting a predetermined weight from a current target SIR to set a next target SIR, if the current block error rate is greater than the target block error rate.

7. The method of claim 5, further comprising:

detecting an occurrence of an error in a received transport block;

increasing an error detection number upon an occurrence of consecutive errors in a received transport block; and flexibly changing a time to perform a transmission power control request, by stopping a target SIR increasing operation, if an error detection number is greater than or equal to a maximum consecutive error number.

8. The method of claim 7, wherein flexibly changing the time to perform the transmission power control request comprises:

detecting an error rate of the received transport block; and stopping the target SIR increasing operation, if a detected error rate is greater than or equal to a maximum error rate.

* * * * *